United States Patent [19]

Arakawa

[11] 4,353,204
[45] Oct. 12, 1982

[54] METHOD OF WATER LEVEL CONTROL FOR A COMBINED CYCLE POWER PLANT AND CONTROL SYSTEM THEREFOR

[75] Inventor: Tadao Arakawa, Hitachi, Japan

[73] Assignee: Hitachi, Ltd., Tokyo, Japan

[21] Appl. No.: 122,479

[22] Filed: Feb. 19, 1980

[30] Foreign Application Priority Data

Feb. 21, 1979 [JP] Japan .................................. 54-18303

[51] Int. Cl.³ .............................................. F02C 6/18
[52] U.S. Cl. ............................. 60/39.02; 60/39.18 B; 122/7 R
[58] Field of Search ........ 60/39.02, 39.14 R, 39.18 B, 60/646, 659, 665, 667; 122/7 R, 7 B

[56] References Cited

U.S. PATENT DOCUMENTS

| 2,684,664 | 7/1954 | Hillen | 60/667 |
| 3,955,358 | 5/1976 | Martz et al. | 60/667 |
| 4,207,842 | 6/1980 | Kehlhofer | 60/39.18 B |
| 4,214,450 | 7/1980 | Nagashima et al. | 60/39.18 B |

Primary Examiner—Louis J. Casaregola
Attorney, Agent, or Firm—Craig and Antonelli

[57] ABSTRACT

A method and system for controlling water level of a drum of a heat recovery steam generator for a combined cycle power plant is provided. The combined cycle power plant includes gas and steam turbines and the steam generator for recovering heat in exhaust gases from the gas turbine and for using the recovered heat to produce and supply steam to the steam turbine. At a start up operation, the water level of the drum is lowered in advance to the plant start up operation so that abrupt rise of the water level due to swelling phenomenon of the boiler water which may result in heat losses by damping water out of the plant is prevented. Also, a gas turbine load increase is maintained at a constant level during a period in which the abrupt water level rise is expected so that the swelling phenomenon is avoided.

39 Claims, 7 Drawing Figures

METHOD OF WATER LEVEL CONTROL FOR A COMBINED CYCLE POWER PLANT AND CONTROL SYSTEM THEREFOR

BACKGROUND AND SUMMARY OF THE INVENTION

The present invention relates to a combined cycle power plant and especially relates to a method and system for controlling water level of a boiler drum in the combined cycle power plant.

The combined cycle power plant generally includes a steam turbine combined with at least one set of a gas turbine and heat recovery steam generator, in which exhaust gas from the gas turbine is led to the heat recovery steam generator, and the steam generated there is utilized for the steam turbine. In the above combined cycle power plant, there are several kinds of water reservoirs such as boiler (steam generator) drum, deaerator reservoir and condenser reservoir. In these reservoirs, the boiler drum functions to provide a stable water supply to the steam generator and also to accumulate heat energy for compensating the changes in the amount of steam generated or consumed in the power plant. Generally, the water level of the boiler drum is preferably controlled to be at a constant water level by adding water into or blowing water out of the boiler drum. Especially, inside the boiler drum there is provided a water vapor separator so that wet steam may not be introduced into the steam turbine. Therefore, it is necessary to control the water level in the boiler drum such that the water level may not exceed the predetermined water level above which the water vapor separator is located.

However, in a starting operation of the combined cycle power plant, the water level in the boiler drum rises abruptly. This is because, when the water in the steam generator reacts with the high temperatured gas turbine exhaust gases, the temperature of the water in the steam generator rises rapidly and evaporation starts suddenly. In this state, vapor phase and liquid phase coexist in the steam generator in an equilibrium state, therefore the average specific volume ($m^3/kg$) of the water swells and the observed volume ($m^3$) of the water increases, which causes an abrupt water level rise in the boiler drum. This water level rise may exceed the highest water level allowed and thereby create a problem of safety. Accordingly, when this water level rise happens, it is necessary to blow out the excessive water out of the drum. However, the water level rise is so rapid and temporary that skilled controls are necessary to blow out the excessive water, otherwise serious safety problems are encountered especially in case where the combined cycle power plant is periodically required to start up and shut down operation every day. Also, heat losses by blowing out the excessive water are large and not negligible.

An ASME PUBLICATION, 75-PWR-23 entitled "Automation of Multi-Generator Combined Cycle Plants" recognizes the problem and suggests that magnitude of the drum level increase can be lowered by changing the steam line valve opening sequence because the "swelling phenomenon" is caused by steam pressure decrease. However, this sequence change brings extremely high pressure in the steam generator which may cause a dangerous situation and also brings delay in start up operation of the steam turbine because pressurized steam is kept in the boiler drum until swelling phenomenon is over instead of supplying into the steam turbine.

An object of the present invention is to provide an improved method and system for controlling water level of the boiler drum of a combined cycle power plant, which is capable of providing stable water level controls at the start up operation.

Another object of the present invention is to provide an improved method and system for controlling water level of the boiler drum so as to reduce heat losses at the start up operation.

According to the present invention, a method and system for controlling boiler drum water level for a combined cycle power plant is provided in which the water level of the boiler drum is advantageously controlled to be within a range defined by the highest water level and normal water level of the boiler drum, so that unstable water level rise and heat energy losses by a water level swelling phenomenon can be eliminated.

According to a feature of the present invention, the normal water control level is lowered below the normal water level in advance of the start up operation of the combined cycle power plant, so that the highest water level by the swelling phenomenon can not exceed the predetermined highest water level. The normal water control level is preferably changed in accordance with the gas turbine load change or heat energy input to the boiler.

According to another feature of the present invention, the gas turbine load is prevented from increasing for a certain period of time in which the swelling phenomenon is expected to occur, thereby the water level rise by the swelling phenomenon is decreased. The gas turbine load is preferably maintained for a certain period at a constant level.

According to still another feature of the present invention, water levels of a condenser reservoir and deaerator reservoir, wherein steam exhausted from the steam turbine is condensed and recycled to the boiler drum through the deaerator reservoir, are respectively controlled in a preferred control level, whereby water level rise in the boiler drum is eliminated. Preferably, the water level of the condenser reservoir is controlled to be constant and the water level of the deaerator reservoir is controlled in accordance with the amount of steam generated in the steam generator.

According to a still further feature of the present invention, excessive water in the boiler drum is preferably introduced into the deaerator reservoir, so that abrupt water level rise in the boiler drum at the start up operation is advantageously eliminated.

These and further objects, features and advantages of the present invention will become more obvious from the following description when taken in connection with the accompanying drawings which show, for purposes of illustration, several embodiments in accordance with the present invention.

DETAILED DESCRIPTION OF THE DRAWINGS

Hereafter water level control system of a combined cycle power plant will be described with reference to FIG. 1, in which the combined cycle power plant includes a gas turbine 10, a heat recovery steam generator 20, a steam turbine 30, a condenser 40 and a deaerator 50. The gas turbine 10 comprises an compressor 11, a gas turbine 12 and an electric generator 13 coaxially coupled thereto. Air introduced through a line 14 to the compressor 11 is compressed and mixed with fuel from fuel supply line 15 and burned in a combuster 16. The combustion gas is then introduced in the gas turbine 12 to rotate the gas turbine 12 and the generator 13. The exhaust gas from the gas turbine 12 is supplied to the heat recovery steam generator 20 through a line 17 as heat source for the heat recovery steam generator 20.

The heat recovery steam generator 20 comprises an economizer 21, a boiler drum 22, an evaporator 23 and a super heater 24. Water in the heat recovery steam generator 20 receives heat energy from the exhaust gas of the gas turbine 10. Water in the economizer 21 is reheated and evaporated in the evaporator 23. The heated water is accumulated in the boiler drum 22 and steam is separated and introduced to the super heater 24 where the steam generated in the evaporator 23 is further heated. The function of the boiler drum 22 is to supply a stable amount of water to the evaporator 23 and also to accumulate heat energy for compensating the changes in steam generated or consumed.

Steam generated in the heat recovery steam generator 20 is supplied to the steam turbine 30 through a line 25. The generator 31 is coupled with the steam turbine 30 and generate electricity by the steam. Exhaust steam from the steam turbine 30 is then condensed in the condenser 40 and accumulated in a reservoir 41 of the condensor 40. The reservoir 41 of the condensor functions to provide a stable pressure head to a condenser pump 42 and also operates as a buffer to compensate the changes in the amount of water supplied to a deaerator 50.

The accumulated water in the reservoir 41 is supplied through lines 43 and 45 by the aid of the condenser pump 42 to the deaerator 50.

In the deaerator 50, the water supplied from the condenser reservoir 41 to a deaerator 51 is deaerated and accumulated in a reservoir 52. The reservoir 52 of the deaerator also functions to provide stable pressure head to a pump 54 and operates as a buffer to prevent changes in amount of water supplied to the boiler drum 22. The water accumulated in the reservoir 52 of the deaerator 50 is then recycled to the economizer 21 of the heat recovery steam generator 20 through a line 53.

A reservoir 60 functions to supply water to the reservoir 41 of the condenser 40, in which water accumulated in the reservoir 60 is supplied to the reservoir 41 through a line 49.

Hereafter, water level control system at a start up operation of the combined cycle power plant according to the preferred embodiment of the present invention will be described.

(A) Boiler Water Level Control

The amount of water kept in the steam generator 20 and the amount of steam generated therein have a certain relationship. That is, when the amount of steam generated decreases, the amount of water which can be kept in the steam generator 20 increases. Therefore, if the water level of the boiler drum 22 is controlled to be at a constant level, excessive amounts of water may be supplied to the boiler drum 22, which will cause abrupt increase in water level of the boiler drum 22.

According to the preferred embodiment of the present invention, the normal control level (NWL) of the boiler drum water is lowered in advance of the start-up operation of the combined cycle power plant, so that even the highest water level resulting from the swelling phenomenon cannot exceed the maximum water level allowed in the boiler drum 22.

Figure 3:
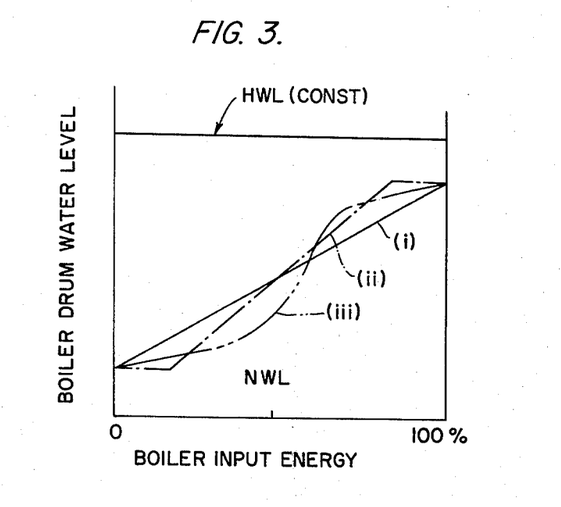
FIG. 3 is a graph showing boiler drum control level and boiler input energy according to a preferred embodiment of the present invention.

Preferably, the NWL is varied in accordance with the change in gas turbine load, which is effective to lower the NWL because at the period when the swelling phenomenon occurs in the boiler drum 22, the gas turbine load is still lower than the normal operating condition. In a preferred embodiment, as illustrated in FIG. 1, the NWL signal is generated through a function generator 101 on the basis of the temperature signal of the exhaust gas from the gas turbine 10 detected by a temperature detector 102. In the function generator 101, the temperature signal of the exhaust gas transmitted through a line 103 is converted into a NWL control signal. Examples of the NWL control signal curves are illustrated in FIG. 3. In case of the curve (i), NWL signal increases in proportion to the amount of heat energy input to the steam generator; therefore, drum water level rises in proportion to the heat energy input to the steam generator. In case of the curves (ii) or (iii), the NWL signal increases substantially in accordance with the amount of heat energy input; however, inclination of NWL increase is not linear. These control patterns such as shown by curves (i), (ii), or (iii) can be preferably selected in view of the characteristic of water level control.

Actual water level in the boiler drum 22 is detected by a level detector 104, and the detected actual water level signal is transmitted to a comparator 106 through line 105, wherein the NWL control signal and the actual water level signal are compared. As a result of comparison, if the NWL control signal is larger than the actual water level signal, a control signal is generated by a controller 107 and a control valve 55 is opened thereby water accumulated in the reservoir 52 is supplied through the line 53, the deaerator pump 54, the economizer 21 into the boiler drum 22. Also, the actual water level signal is compared at a comparator 108 with a predetermined highest water level (HWL) signal of the boiler 22 which is a constant water level as shown in FIG. 3. As a result of the comparison, if the actual water level signal is larger than the HWL signal, a control signal is generated by a controller 109 and excessive water in the drum 22 is blown out to a blow-out tank 26 through a line 27 by opening a control valve 28. Therefore, the water level in the boiler drum 22 is controlled to be within a range defined between the NWL and HWL, even if the water level rise by the swelling phenomenon occurs.

Figure 2:
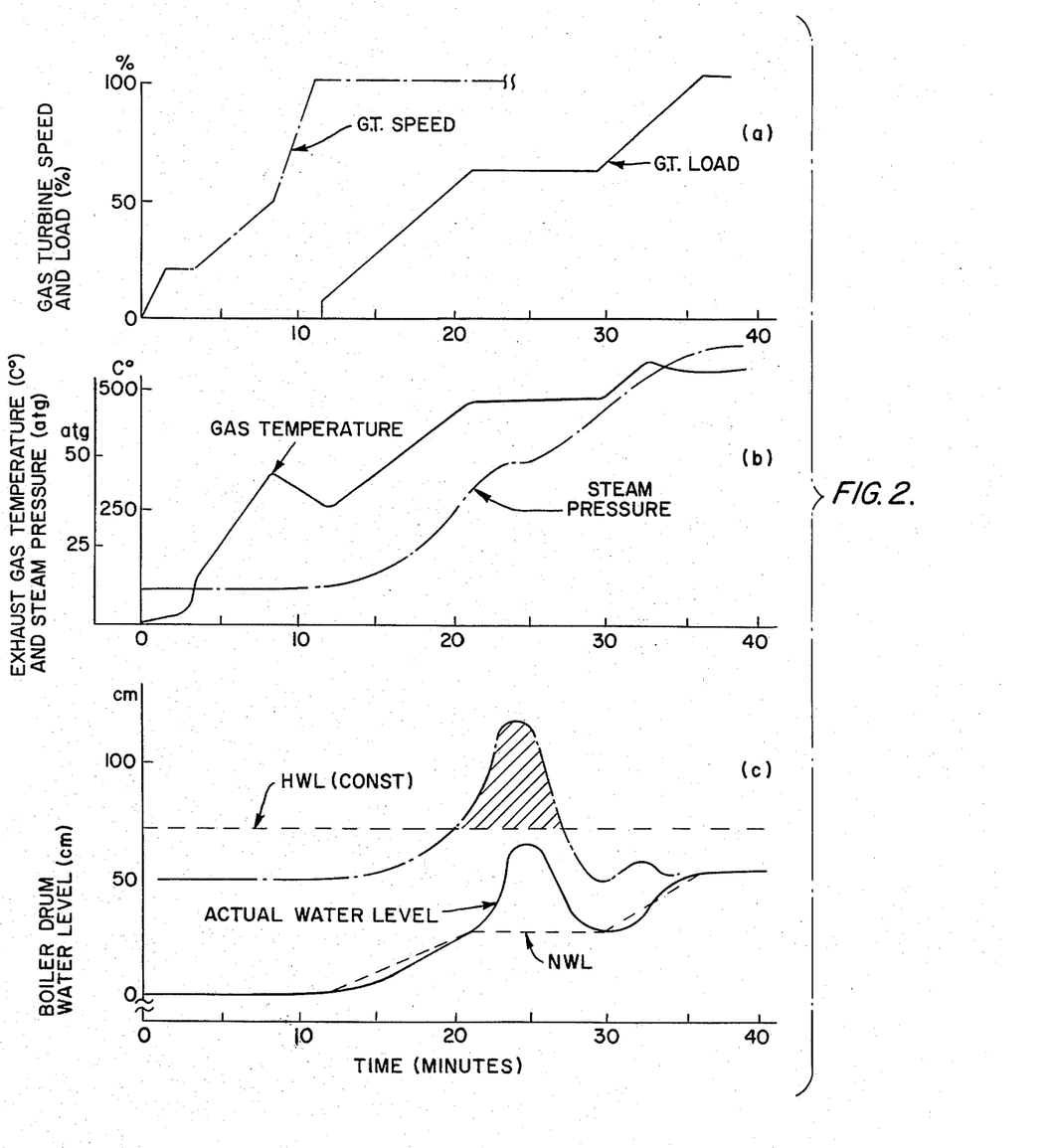
FIG. 2 is a graph showing respectively (a) gas turbine speed and load changes; (b) gas temperature and steam pressure changes; and (c) water level changes in boiler drum.

FIG. 2 shows changes in various factors at a starting operation in accordance with the above-described boiler water level control method; the gas turbine speed and load are normally increased as shown in FIG. 2(a). With the increase of gas turbine load, gas turbine exhaust gas temperature and steam pressure increased proportionally as shown in FIG. 2(b). By the above fact, water level of the boiler drum increases abruptly and shaded portion of the water is blown out if the water level control signal is not changed as shown by the dot-dash curve in FIG. 2(c). According to the present invention, the normal control level NWL is lowered below the usual water level at the starting operation and rises with the increase of gas turbine load or gas temperature so that even if the swelling phenomenon occurs, the actual water level is kept within the range defined by NWL and HWL.

Referring again to FIG. 1, hereafter an embodiment to avoid abrupt increase of the water level by gas turbine load control is described.

(B) Gas Turbine Load Control

One of the reasons for the occurrence of the swelling phenomenon is the sudden increase of gas temperature. According to an embodiment of the present invention, gas turbine load increase at the start-up operation is maintained, for example, at a constant level for a certain period of time until the swelling phenomenon finishes. In the present embodiment, gas turbine exhaust gas temperature which represents the gas turbine load is detected by the temperature detector 102 and when the temperature reaches a certain amount, preferably 350° C.~400° C., a controller 202, which receives the temperature signal through a line 201, generates a control signal through a line 203 to a gas turbine load controller 204. At a starting operation, the controller 204 provides a load control signal to a fuel control valve 18 through a line 205 according to a predetermined load increase sequence. In case the temperature reaches the predetermined amount, the controller 202 gives a load increase constant level signal to the gas turbine load controller 204, therefore gas turbine load increase is maintained at a constant level for a certain period. The constant level signal is continued until the swelling phenomenon is completed, which timing is determined by the NWL signal through a line 207 and the actual water level signal through a line 206. In the controller 202, the differential of the water level changes is calculated from the NWL signal and actual water level signal, and if the differential of the water level is negative (water level is decreasing) and the actual water level is lower than a predetermined amount, the load increase constant level signal is discontinued.

Figure 4:
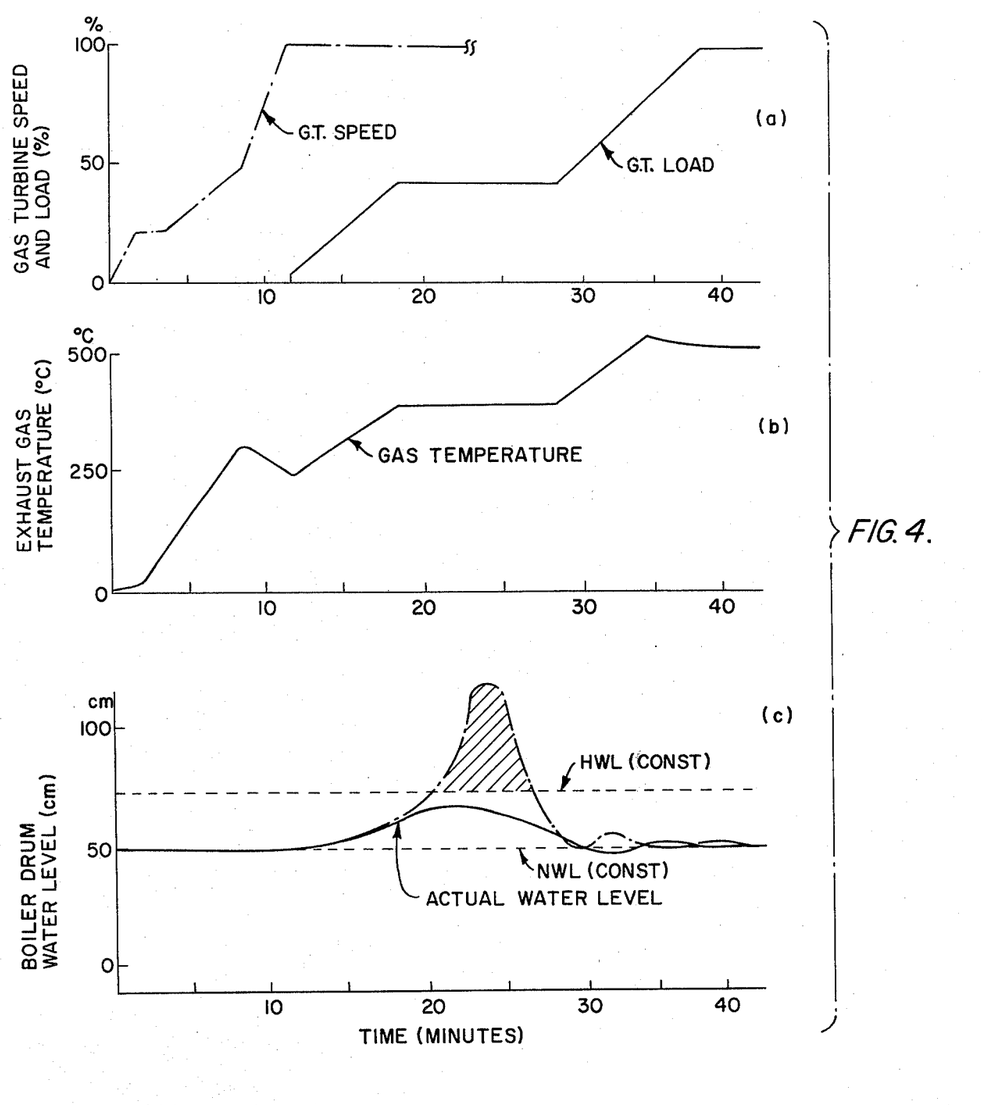
FIG. 4 is a graph showing respectively (a) gas turbine speed and load changes, (b) gas temperature changes, and (c) water level changes in boiler drum according to a preferred embodiment of the present invention.

FIG. 4 shows experimental results of the combined cycle power plant according to the above gas turbine load control method. As is shown from FIGS. 4(a), (b) and (c), by the constant level of gas turbine load increase, not only the gas temperature increase is delayed, but also the water level rise by the swelling phenomenon is decreased, which is apparent by comparing with the water level change of the conventional method illustrated by the dot-dash curve in FIG. 4(c).

Figure 5:
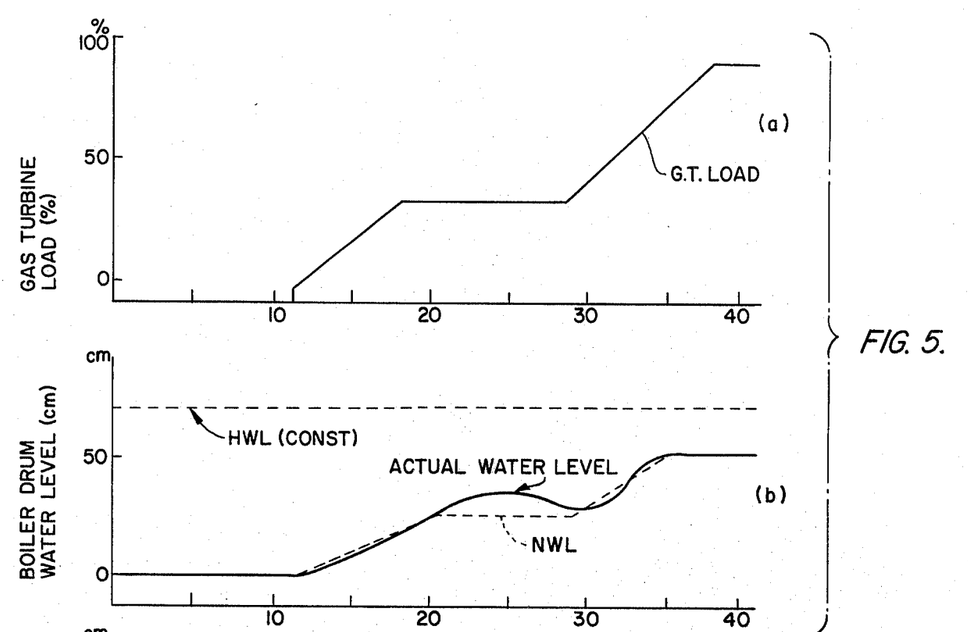
FIG. 5 is a graph showing respectively (a) gas turbine load changes and (b) water level changes in boiler drum according to a preferred embodiment of the present invention.

FIG. 5 shows a result of combination of the above drum water level controls (A) and the gas turbine load controls (B), in which not only the normal water control level: NWL is changed in accordance with the changes in gas turbine load, but also the gas turbine load increase is maintained at a constant level for a certain period of time in which the swelling phenomenon is expected. By the above-combined control method, drum water level change can be controlled.

Figure 1:
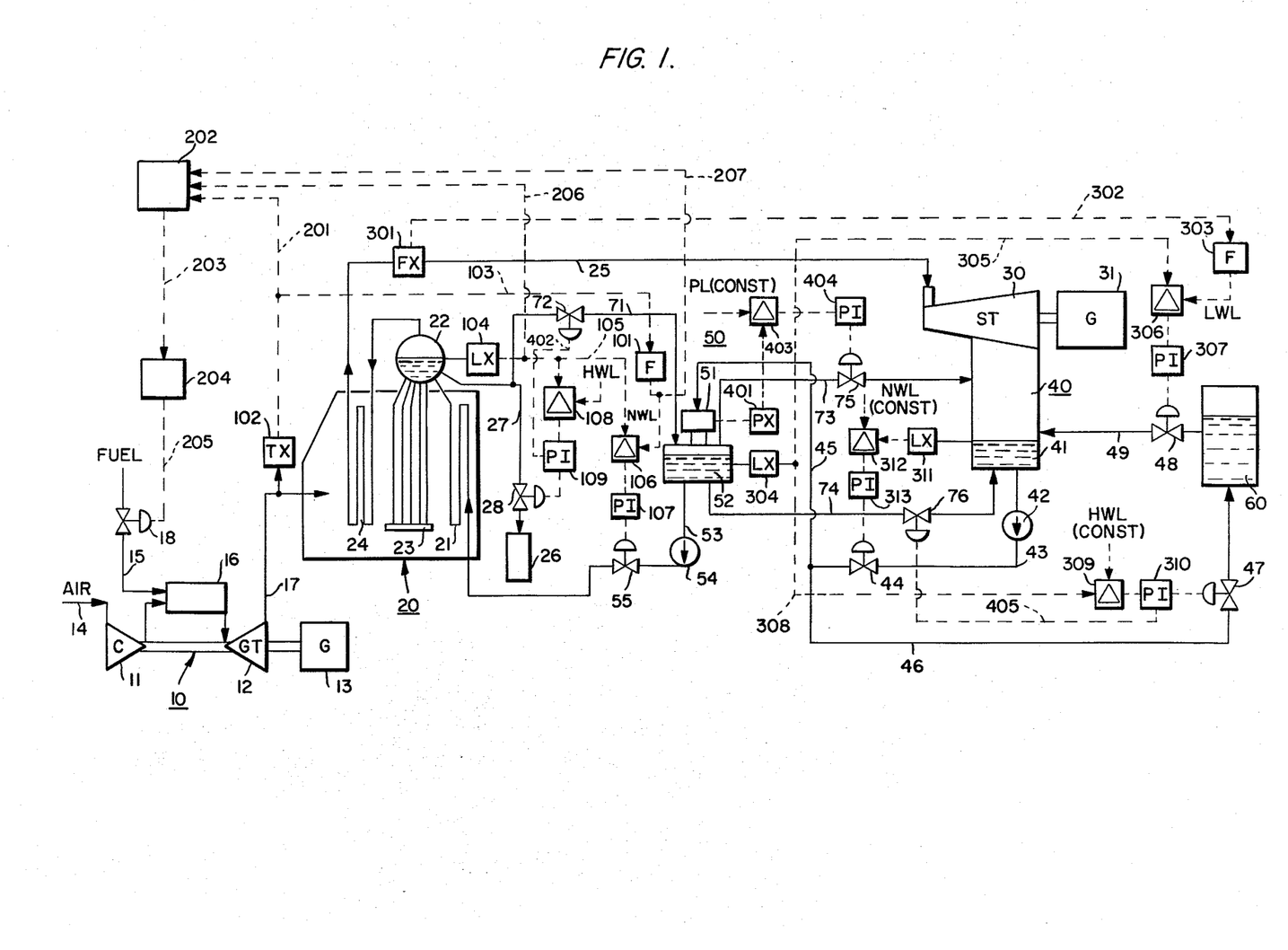
FIG. 1 is a schematic flow diagram showing a water control system of a combined cycle power plant according to preferred embodiments of the present invention.

Referring to FIG. 1, hereafter still another embodiment of the present invention will be explained.

(C) Deaerator Water Level Control

Figure 6:
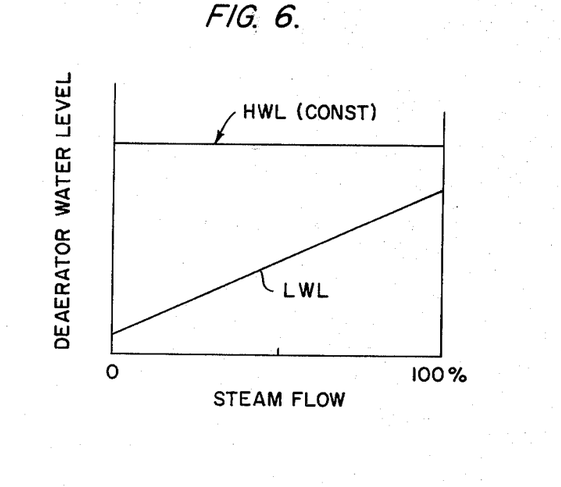
FIG. 6 is a graph showing deaerator control level and steam flow rate according to a preferred embodiment of the invention.

The greater the capacity of steam generator becomes, the more capacity the boiler drum requires to accomplish the above-described boiler drum water level controls. In the preferred embodiment of the present invention, a part of boiler water which is excessive as compared with the amount of steam generated is accumulated in the reservoir of the deaerator 52 while the water level of the condenser reservoir 41 is controlled to be at a constant level. The water level of the deaerator reservoir 52 is controlled by lowest water level (LWL) signal, for example, as shown in FIG. 6, in which LWL signal changes in accordance with the amount of steam generated in the steam generator 20.

The water level of the condenser reservoir 41 is controlled to be a predetermined constant level: NWL, that is, the actual water level of the condenser reservoir 41 is detected by a detector 311 and compared with the NWL (Const.) signal at a comparator 312. If the actual water level of the condenser reservoir 41 is higher than the NWL (Const.), a control signal is generated by a controller 313 to open a control valve 44 so that water in the condenser reservoir is introduced into the deaerator 50, through lines 43 and 45 until the water level of the condenser reservoir becomes the NWL (Const.).

The water level of the deaerator reservoir 52 is controlled by two control factors, that is, the amount of water introduced from the reservoir 60 through a line 49, control valve 48 into the condenser reservoir 41, and the amount of water subtracted from the line 45 into the reservoir 60 through a line 46 and controller 47. The valve opening of the control valve 48 is controlled by a control signal from a controller 307. Actual water level of deaerator reservoir 52 is detected by a level detector 304. The lowest water level (LWL) signal is generated in a function generator on the basis of steam flow signals detected by a steam flow detector 301 provided along the steam supply line 25. The steam flow signals through a line 302 is transformed into the LWL signals as shown, for example, in FIG. 6 and compared with the actual water level signals through a line 305 is compared by a comparator 306. If the actual water level of the deaerator reservoir 50 is lower than LWL, the control valve 48 is opened and water in the reservoir 60 is introduced into the condenser reservoir 41. As the condenser water level is controlled to be constant, excessive water in the condenser reservoir 41 is introduced into the deaerator reservoir 52 until the deaerator water level exceeds the variable LWL. Also, the deaerator reservoir 52 is equipped with a predetermined highest water level; HWL (const.). The actual water level signal of the deaerator reservoir 52 is transmitted to a comparator 309, wherein the HWL signal and the detected actual water level of the deaerator is compared. If the actual deaerator water level exceed the highest water level; HWL, a controller 310 generates a control signal to open the control valve 47 so that the excessive water can not be introduced into the deaerator reservoir 52. According to the present embodiment, changes in the amount of water kept in the boiler drum 22 due to changes in the amount of steam generated can be partly compensated by the water level changes in the deaerator reservoir 52 within a range of HWL and LWL. If the lowest water level, LWL is preferably varied in proportion to the changes in the deaerator water level, it is enough to feed only a few amounts of water into the condenser reservoir 41 through the control valve 48, which amount corresponds to the amount of water leakage during the operation. Therefore, the control valve 48 can be almost always closed.

Referring again to FIG. 1, hereafter a still further embodiment of the present invention will be explained.

(D) Excessive Drum Water Recovery Control

In this embodiment, boiler water level which exceeds the highest water level: HWL is recovered in the deaerator 50 instead of blowing out the excessive water to the blow out tank 26. As shown in FIG. 1, a line 71 connecting the boiler drum 22 and the deaerator reservoir 52 with a control valve 72 is provided. Further, two other lines 73 and 74 are provided between the deaerator reservoir 52 and the condenser reservoir 41 respectively with control valves 75 and 76. The deaerator 51 is also provided with a pressure detector 401 and a water level detector 304. The water level of the boiler drum 22 is controlled such that if the water level of the drum exceeds the predetermined highest water level: HWL, the controller 109 provides a control signal to open the valve 72 through a line 402 and excessive heated drum water is returned to the deaerator reservoir 52. The heated water from the boiler drum 22 is separated into drain water and steam. In order to avoid an excessive pressure rise in the deaerator reservoir 52, the pressure in the deaerator 51 is detected by the detector 401. If the pressure exceeds a predetermined pressure level: PL, which is determined in a comparator 403, a control signal is provided to the control valve 75 to open it by a controller 404, so that the excessive steam in the deaerator 51 is vented to the condenser 40. Also, the water level of the deaerator reservoir 52 is controlled by adjusting valve opening of the control valve 76 by the control signal from the controller 310 through a line 405, so that the water level of the deaerator reservoir 52 does not exceed the predetermined highest water level: HWL. By the above embodiment, an abnormal water level rise in the deaerator reservoir 52 can be eliminated. The control valve 76 operates as a safety valve for the deaerator 50 in the case where the water level detector 304 detects an abnormal water level rise.

Figure 7:
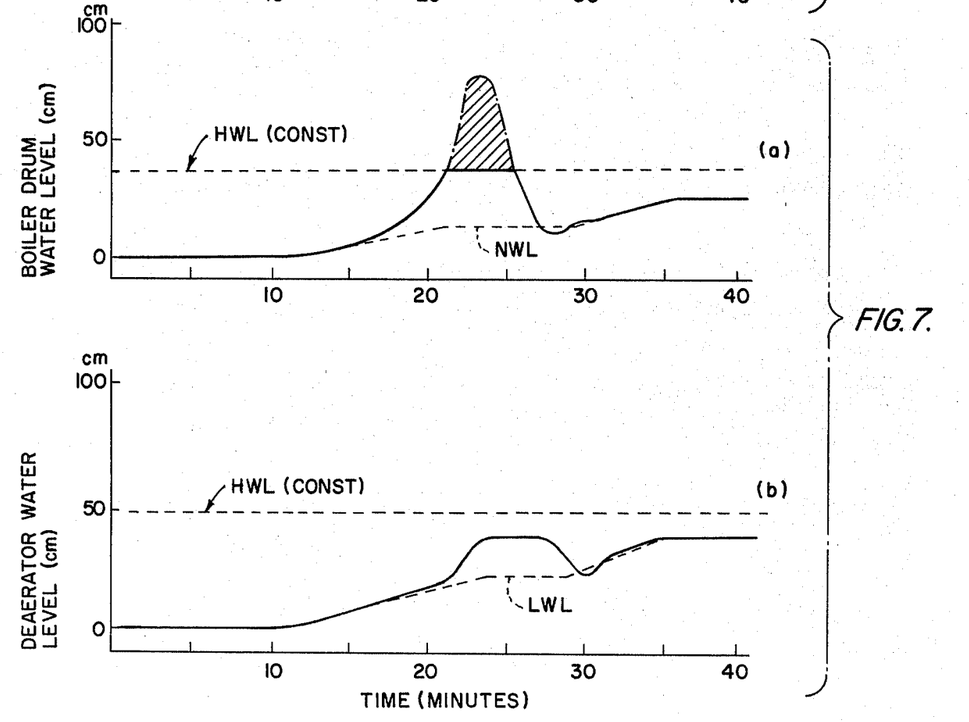
FIG. 7 is a graph showing respectively (a) boiler drum water level changes and (b) deaerator water level changes, according to a preferred embodiment of the present invention.

FIGS. 7(a), (b) respectively show experimental results of the above three control methods of (A), (C) and (D). As apparent from the drawings, even if the boiler drum water level exceeds the highest water level; HWL, the excessive water in the boiler drum can be absorbed in the deaerator reservoir 52, and abnormal water level rise either boiler drum 22 or deaerator reservoir 52 can be eliminated. Also, heat energy losses by blowing excessive water out of the system is eliminated.

What is claimed is:

1. A method of water level control for a combined cycle power plant which includes gas and steam turbines and a steam generator for recovering heat in exhaust gases from the gas turbine and for using the recovered heat to produce and supply steam to the steam turbine, the steam generator including a drum for containing water, preventing excessive water level increase in the steam generator drum resulting from at least the swelling phenomena by controlling the water level in the steam generator drum during a start-up operation of the powder plant such that the water level in the drum is maintained below a predetermined excessive water level, and wherein the step of controlling the water level in the drum includes lowering the water level in the drum prior to the start-up operation and thereafter increasing the water level in the drum substantially in accordance with the increase of the gas turbine load.

2. A method according to claim 1, wherein the controlling step includes the steps of:
   detecting the actual water level in the drum;
   detecting the temperature of the exhaust gases from the gas turbine, which corresponds to the gas turbine load;
   generating a normal control level signal for the drum on the basis of the exhaust gas turbine temperature;
   comparing the normal control level and actual water level of the drum; and
   controlling the water level of the drum by supplying water into the drum or exhausting water out of the drum in accordance with the results of the comparison.

3. A method according to claim 1 or 2, further including the step of preventing gas turbine load from increasing for a certain period of time at the start-up operation in which a water level increase is expected to occur by the swelling phenomenon.

4. A method according to claim 3, including the steps of detecting the temperature of the gas turbine;
   detecting the actual water level of the drum; and
   preventing gas turbine load from increasing when the gas temperature becomes 350° C. to 400° C. until the actual water level decreases below a predetermined water level.

5. A method according to claim 3, wherein the combined cycle power plant further includes a condenser where steam used in the steam turbine is condensed and reserved, and a deaerator where the condensed water reserved in the condenser is deaerated and reserved for recirculating to the steam generator, the method further including the steps of controlling the water level of the deaerator in accordance with the amount of steam generated in the steam generator and controlling the water level of the condenser at a constant level.

6. A method according to claim 4, wherein the combined cycle power plant further includes a condenser where steam used in the steam turbine is condensed and reserved, and a deaerator where the condensed water reserved in the condenser is deaerated and reserved for recirculating to the steam generator, the method further including the steps of controlling the water level of the deaerator in accordance with the amount of steam generated in the steam generator and controlling the water level of the condenser at a constant level.

7. A method according to claim 5, wherein the step of controlling the water level of the deaerator includes detecting steam flow from the steam generator, generating a lowest control level signal for the deaerator on the basis of the steam flow rate, detecting actual water level of the deaerator, comparing a lowest control level and actual water level of the deaerator, detecting actual water level of the condenser, controlling the water level of the condenser to be at a constant level by supplying water into the condenser in accordance with the comparison, and by dumping water in the condenser into the deaerator reservoir.

8. A method according to claim 6, wherein the step of controlling the water level of the deaerator includes detecting steam flow from the steam generator, generating a lowest control level signal for the deaerator on the basis of the steam flow rate, detecting actual water level of the deaerator, comparing a lowest control level and actual water level of the deaerator, detecting actual water level of the condenser, controlling the water level of the condenser to be at a constant level by supplying water into the condenser in accordance with the comparison, and by dumping water in the condenser into the deaerator reservoir.

9. A method according to claim 5, further including the step of introducing excessive water in the drum into the deaerator reservoir, and introducing water and vapor in the deaerator reservoir into the condenser reservoir in accordance with the water level and pressure in the deaerator reservoir.

10. A method according to claim 6, further including the step of introducing excessive water in the drum into the deaerator reservoir, and introducing water and vapor in the deaerator reservoir into the condenser reservoir in accordance with the water level and pressure in the deaerator reservoir.

11. A method according to claim 7, further including the step of introducing excessive water in the drum into the deaerator reservoir, and introducing water and vapor in the deaerator reservoir into the condenser reservoir in accordance with the water level and pressure in the deaerator reservoir.

12. A method according to claim 8, further including the step of introducing excessive water in the drum into the deaerator reservoir, and introducing water and vapor in the deaerator reservoir into the condenser reservoir in accordance with the water level and pressure in the deaerator reservoir.

13. A method according to claim 1, wherein the combined cycle power plant further includes a condenser where steam used in the steam turbine is condensed and reserved, and a deaerator where the condensed water reserved in the condenser is deaerated and reserved for recirculating to the steam generator, the method further including the steps of controlling the water level of the deaerator in accordance with the amount of steam generated in the steam generator and controlling the water level of the condenser at a constant level.

14. A method according to claim 2, wherein the combined cycle power plant further includes a condenser where steam used in the steam turbine is condensed and reserved, and a deaerator where the condensed water reserved in the condenser is deaerated and reserved for recirculating to the steam generator, the method further including the steps of controlling the water level of the deaerator in accordance with the amount of steam generated in the steam generator and controlling the water level of the condenser at a constant level.

15. A method according to claim 13, wherein the step of controlling the water level of the deaerator includes detecting steam flow from the steam generator, generating a lowest control level signal for the deaerator on the basis of the steam flow rate, detecting actual water level of the deaerator, comparing a lowest control level and actual water level of the deaerator, detecting actual water level of the condenser, controlling the water level of the condenser to be at a constant level by supplying water into the condenser in accordance with the comparison, and by dumping water in the condenser into the deaerator reservoir.

16. A method according to claim 14, wherein the step of controlling the water level of the deaerator includes detecting steam flow from the steam generator, generating a lowest control level signal for the deaerator on the basis of the steam flow rate, detecting actual water level of the deaerator, comparing a lowest control level and actual water level of the deaerator, detecting actual water level of the condenser, controlling the water level of the condenser to be at a constant level by supplying water into the condenser in accordance with the comparison, and by dumping water in the condenser into the deaerator reservoir.

17. A method according to claim 13, further including the step of introducing excessive water in the drum into the deaerator reservoir, and introducing water and vapor in the deaerator reservoir into the condenser reservoir in accordance with the water level and pressure in the deaerator reservoir.

18. A method according to claim 14, further including the step of introducing excessive water in the drum into the deaerator reservoir, and introducing water and vapor in the deaerator reservoir into the condenser reservoir in accordance with the water level and pressure in the deaerator reservoir.

19. A method according to claim 15, further including the step of introducing excessive water in the drum into the deaerator reservoir, and introducing water and vapor in the deaerator reservoir into the condenser reservoir in accordance with the water level and pressure in the deaerator reservoir.

20. A method according to claim 16, further including the step of introducing excessive water in the drum into the deaerator reservoir, and introducing water and vapor in the deaerator reservoir into the condenser reservoir in accordance with the water level and pressure in the deaerator reservoir.

21. A method according to claim 1 or 2, wherein the combined cycle power plant further includes a condenser where steam used in the steam turbine is condensed and reserved, and a deaerator where the condensed water reserved in the condenser is deaerated and reserved for recirculating to the steam generator, the method further including the step of introducing excessive water in the boiler drum into the deaerator reservoir, and introducing water and vapor in the deaerator reservoir into the condenser reservoir in accordance with the water level and pressure in the deaerator reservoir.

22. A method according to claim 3, wherein the combined cycle power plant further includes a condenser where steam used in the steam turbine is condensed and reserved, and a deaerator where the condensed water reserved in the condenser is deaerated and reserved for recirculating to the steam generator, the method further including the step of introducing excessive water in the boiler drum into the deaerator reservoir, and introducing water and vapor in the deaerator reservoir into the condenser reservoir in accordance with the water level and pressure in the deaerator reservoir.

23. A method according to claim 4, wherein the combined cycle power plant further includes a condenser where steam used in the steam turbine is condensed and reserved, and a deaerator where the condensed water reserved in the condenser is deaerated and reserved for recirculating to the steam generator, the method further including the step of introducing excessive water in the boiler drum into the deaerator reservoir, and introducing water and vapor in the deaerator reservoir into the condenser reservoir in accordance with the water level and pressure in the deaerator reservoir.

24. A method of water level control for a combined cycle power plant which includes gas and steam turbines and a steam generator for recovering heat in exhaust gases from the gas turbine and for using the recovered heat to produce and supply steam to the steam turbine, the steam generator including a drum for containing water, preventing excessive water level increase in the steam generator drum resulting from at least the swelling phenomena by controlling the water level in the steam generator drum during a start-up operation of the power plant such that the water level in the drum is maintained below a predetermined excessive water level, including the step of preventing gas turbine load from increasing for a certain period of time at the start up operation in which a water level increase is expected to occur by the swelling phenomenon, and wherein the combined cycle power plant further includes a condenser where steam used in the steam turbine is condensed and reserved, and a deaerator where the condensed water reserved in the condenser is deaerated and reserved for recirculating to the steam generator, the method further including the steps of controlling the water level of the deaerator in accordance with the amount of steam generated in the steam generator and controlling the water level of the condenser at a constant level.

25. A method of water level control for a combined cycle power plant which includes gas and steam turbines and a steam generator for recovering heat in exhaust gases from the gas turbine and for using the recovered heat to produce and supply steam to the steam turbine, the steam generator including a drum for containing water, preventing excessive water level increase in the steam generator drum resulting from at least the swelling phenomena by controlling the water level in the steam generator drum during a start-up operation of the power plant such that the water level in the drum is maintained below a predetermined excessive water level, including the step of preventing gas turbine load from increasing for a certain period of time at the start up operation in which a water level increase is expected to occur by the swelling phenomenon, and wherein the combined cycle power plant further includes a condenser where steam used in the steam turbine is condensed and reserved, and a deaerator where the condensed water reserved in the condenser is deaerated and reserved for recirculating to the steam generator, the method further including the step of introducing excessive water in the boiler drum into the deaerator reservoir, and introducing water and vapor in the deaerator reservoir into the condenser reservoir in accordance with the water level and pressure in the deaerator reservoir.

26. A method of water level control for a combined cycle power plant which includes gas and steam turbines and a steam generator for recovering heat in exhaust gases from the gas turbine and for using the recovered heat to produce and supply steam to the steam turbine, the steam generator including a drum for containing water, preventing excessive water level increase in the steam generator drum resulting from at least the swelling phenomena by controlling the water level in the steam generator drum during a start-up operation of the power plant such that the water level in the drum is maintained below a predetermined excessive water level, including the step of preventing gas turbine load from increasing for a certain period of time at the start up operation in which a water level increase is expected to occur by the swelling phenomenon, and further including a step of detecting the temperature of the gas turbine; detecting the actual water level of the drum; and preventing turbine load from increasing when the gas temperature becomes 350° C. to 400° C. until the actual water level decreases below a predetermined water level.

27. A method according to claim 26, wherein the combined cycle power plant further includes a condenser where steam used in the steam turbine is condensed and reserved, and a deaerator where the condensed water reserved in the condenser is deaerated and reserved for recirculating to the steam generator, the method further including the steps of controlling the water level of the deaerator in accordance with the amount of steam generated in the steam generator and controlling the water level of the condenser at a constant level.

28. A method according to claim 27 or 24, wherein the step of controlling the water level of the deaerator includes detecting steam flow from the steam generator, generating a lowest control level signal for the deaerator on the basis of the steam flow rate, detecting actual water level of the deaerator, comparing a lowest control level and actual water level of the deaerator, detecting actual water level of the condenser, controlling the water level of the condenser to be at a constant level by supplying water into the condenser in accordance with the comparison, and by dumping water in the condenser into the deaerator reservoir.

29. A method according to claim 26, wherein the combined cycle power plant further includes a condenser where steam used in the steam turbine is condensed and reserved, and a deaerator where the condensed water reserved in the condenser is deaerated and reserved for recirculating to the steam generator, the method further including the step of introducing excessive water in the boiler drum into the deaerator reservoir, and introducing water and vapor in the deaerator reservoir into the condenser reservoir in accordance with the water level and pressure in the deaerator reservoir.

30. A method according to claim 27 or 24 further including the step of introducing excessive water in the drum into the deaerator reservoir, and introducing water and vapor in the deaerator reservoir into the condenser reservoir in accordance with the water level and pressure in the deaerator reservoir.

31. A method according to claim 28, further includes the step of introducing excessive water in the drum into the deaerator reservoir, and introducing water and vapor in the deaerator reservoir into the condenser reservoir in accordance with the water level and pressure in the deaerator reservoir.

32. A method of water level control for a combined cycle power plant which includes gas and steam turbines and a steam generator for recovering heat in exhaust gases from the gas turbine and for using the recovered heat to produce and supply steam to the steam turbine, the steam generator including a drum for containing water, preventing excessive water level increase in the steam generator drum resulting from at least the swelling phenomena by controlling the water level in the steam generator drum during a start-up operation of the power plant such that the water level in the drum is maintained below a predetermined excessive water level, wherein the combined cycle power plant further includes a condenser where steam used in the steam turbine is condensed and reserved, and a deaerator where the condensed water reserved in the condenser is deaerated and reserved for recirculating to the steam generator, the method further including the steps of controlling the water level of the deaerator in accordance with the amount of steam generated in the steam generator and controlling the water level of the condenser at a constant level.

33. A method according to claim 32, wherein the step of controlling the water level of the deaerator includes detecting steam flow from the steam generator, generating a lowest control level signal for the deaerator on the basis of the steam flow rate, detecting actual water level of the deaerator, comparing a lowest control level and actual water level of the deaerator, detecting actual water level of the condenser, controlling the water level of the condenser to be at a constant level by supplying water into the condenser in accordance with the comparison, and by dumping water in the condenser into the deaerator reservoir.

34. A method according to claim 33, further including the step of introducing excessive water in the drum into the deaerator reservoir, and introducing water and vapor in the deaerator reservoir into the condenser reservoir in accordance with the water level and pressure in the deaerator reservoir.

35. A method of water level control for a combined cycle power plant which includes gas and steam turbines and a steam generator for recovering heat in exhaust gases from the gas turbine and for using the recovered heat to produce and supply steam to the steam turbine, the steam generator including a drum for containing water, preventing excessive water level increase in the steam generator drum resulting from at least the swelling phenomena by controlling the water level in the steam generator drum during a startup operation of the power plant such that the water level in the drum is maintained below a predetermined excessive water level, wherein the combined cycle power plant further includes a condenser where steam used in the steam turbine is condensed and reserved, and a deaerator where the condensed water reserved in the condenser is deaerated and reserved for recirculating to the steam generator, the method further including the step of introducing excessive water in the boiler drum into the deaerator reservoir, and introducing water and vapor in the deaerator reservoir into the condenser reservoir in accordance with the water level and pressure in the deaerator reservoir.

36. A water level control system for a combined cycle power plant comprising: a gas turbine, a steam turbine, a steam generator for recovering heat in exhaust gases from said gas turbine and for using the recovered heat to produce and supply steam to said steam turbine, and said steam generator having a drum for reserving water, a condenser having a condenser reservoir where the steam used in said steam turbine is condensed and reserved, a deaerator having a deaerator reservoir where the condensed water in said condenser is deaerated and reserved, and water level control means for preventing excessive water level increase in said drum resulting at least from the swelling phenomenon, said water level control means controlling the water level in the drum at least during a start up operation of the power plant such that the water level in said drum is maintained below a predetermined excessive water level, wherein said water level control means includes: water level detecting means for detecting actual water level in said drum, temperature detecting means for detecting temperature of the exhaust gases from said gas turbine, control level signal generating means for generating a normal control level signal for said drum on the basis of the exhaust gas temperature detected by said temperature detecting means, comparing means for comparing the normal control level signal from said control signal generating means and the actual water level signal from said water level detecting means, and drum water level control means for controlling the amount of water supplied into and exhausted out of said drum in response to said comparing means.

37. A water level control system for a combined cycle power plant comprising: a gas turbine, a steam turbine, a steam generator for recovering heat in exhaust gases from said gas turbine and for using the recovered heat to produce and supply steam to said steam turbine, and said steam generator having a drum for reserving water, a condenser having a condenser reservoir where the steam used in said steam turbine is condensed and reserved, a deaerator having a deaerator reservoir where the condensed water in said condenser is deaerated and reserved, and water level control means for preventing excessive water level increase in said drum resulting at least from the swelling phenomenon, said water level control means controlling the water level in the drum at least during a start up operation of the power plant such that the water level in said drum is maintained below a predetermined excessive water level, wherein said water level control means includes temperature detecting means for detecting temperature of the exhaust gases from said gas tubine, water level detecting means for detecting actual water level in said drum, and gas turbine load control means for preventing the gas turbine load from increasing for a certain period of time in accordance with the exhaust gas temperature detected by said temperature detecting means and the actual water level in said drum detected by said water level detecting means.

38. A water level control system for a combined cycle power plant comprising: a gas turbine, a steam turbine, a steam generator for recovering heat in exhaust gases from said gas turbine and for using the recovered heat to produce and supply steam to said steam turbine, and said steam generator having a drum for reserving water, a condenser having a condenser reservoir where the steam used in said steam turbine is condensed and reserved, a deaerator having a deaerator reservoir where the condensed water in said condenser is deaerated and reserved, and water level control means for preventing excessive water level increase in said drum resulting at least from the swelling phenomenon, said water level control means controlling the water level in the drum at least during a start up operation of the power plant such that the water level in said drum is maintained below a predetermined excessive water level, where said water level control means includes steam flow detecting means for detecting amount of steam generated in said steam generator, control level signal generating means for generating a lowest control level signal for said deaerator reservoir in accordance with the steam flow signal detected by said steam flow detecting means, first water level detecting means for detecting actual water level in said deaerator reservoir, first comparing means for comparing the lowest control level signal generated by said control level signal generating means and the actual water level signal of said deaerator reservoir detected by said water level detecting means, second water level detecting means for detecting actual water level in said condenser reservoir, second comparing means for comparing the actual water level detected by said second water level detecting means for said condenser reservoir and a predetermined water level for said condenser reservoir, control means for controlling the water level of said condenser reservoir to be at a constant level while controlling the water level of said deaerator reservoir to be at the lowest control level by supplying water into said condenser reservoir in response to said first comparing means and by dumping water in said condenser reservoir into said deaerator reservoir in response to said second comparing means.

39. A water level control system for a combined cycle power plant comprising: a gas turbine, a steam turbine, a steam generator for recovering heat in exhaust gases from said gas turbine and for using the recovered heat to produce and supply steam to said steam turbine, and said steam generator having a drum for reserving water, a condenser having a condenser reservoir where the steam used in said steam turbine is condensed and reserved, a deaerator having a deaerator reservoir where the condensed water in said condenser is deaerated and reserved, and water level control means for preventing excessive water level increase in said drum resulting at least from the swelling phenomenon, said water level control means controlling the water level in the drum at least during a start up operation of the power plant such that the water level in said drum is maintained below a predetermined excessive water level, further including water level detecting means for detecting actual water level in said drum and providing a signal indicative thereof, comparing means for comparing the actual water level signal in said drum detected by said water level detecting means and a predetermined highest water level signal, means for introducing excessive water in said drum into said deaerator reservoir, means for controlling the amount of water introduced into said deaerator reservoir by said introducing means in response to said comparing means.

* * * * *